CORROSION-EROSION-CAVITATION PROTECTION FOR MARINE PROPELLERS

Filed Nov. 10, 1958 7 Sheets-Sheet 1

INVENTORS.
H. S. PREISER
F. E. COOK

BY W. O. Quesenberry
B. L. Zangwill
ATTORNEYS

CORROSION-EROSION-CAVITATION PROTECTION FOR MARINE PROPELLERS

Filed Nov. 10, 1958 7 Sheets-Sheet 2

INVENTORS
H. S. PREISER
F. E. COOK

W. O. Quesenbery
B. L. Zangwill
ATTORNEYS

CORROSION-EROSION-CAVITATION PROTECTION FOR MARINE PROPELLERS

Filed Nov. 10, 1958 7 Sheets-Sheet 3

INVENTORS.

H. S. PREISER
F. E. COOK

BY

W. O. Quesenbery
B. L. Zangwill
ATTORNEYS

Aug. 14, 1962 H. S. PREISER ETAL 3,049,479

CORROSION-EROSION-CAVITATION PROTECTION FOR MARINE PROPELLERS

Filed Nov. 10, 1958 7 Sheets-Sheet 4

INVENTORS
H. S. PREISER
F. E. COOK

BY W. O. Quesenbery
B. L. Zangwill
ATTORNEYS

CORROSION-EROSION-CAVITATION PROTECTION FOR MARINE PROPELLERS

Filed Nov. 10, 1958

7 Sheets-Sheet 5

INVENTORS.
H. S. PREISER
BY F. E. COOK
W. O. Quesenberry
B. L. Zangwill
ATTORNEYS.

CORROSION-EROSION-CAVITATION PROTECTION FOR MARINE PROPELLERS

Filed Nov. 10, 1958

7 Sheets-Sheet 6

INVENTORS.
H. S. PREISER
F. E. COOK

BY

ATTORNEYS

CORROSION-EROSION-CAVITATION PROTECTION FOR MARINE PROPELLERS

Filed Nov. 10, 1958 7 Sheets-Sheet 7

INVENTORS.
H. S. PREISER
F. E. COOK

BY W. O. Quesenbery
B. L. Zangwill
ATTORNEYS

United States Patent Office 3,049,479
Patented Aug. 14, 1962

3,049,479
CORROSION-EROSION-CAVITATION PROTECTION FOR MARINE PROPELLERS

Herman S. Preiser, North Springfield, and Frank E. Cook, Arlington, Va., assignors to Chemionics Engineering Laboratories, Inc., a corporation of North Carolina Filed Nov. 10, 1958, Ser. No. 773,122
5 Claims. (Cl. 204—147)
(Granted under Title 35, U.S. Code (1952), sec. 266)

The invention described herein may be manufactured and used by or for the Government of the United States of America for governmental purposes without the payment of any royalties thereon or therefor.

This invention relates to the protection of marine propellers, pumps, impellers, or the like from the deteriorating effects of corrosion-erosion environment in sea water.

More particularly, this invention relates to cathodic protection of propellers and the like against the damaging effects of corrosion, erosion and cavitation.

Experience has shown that corrosion, erosion and cavitation are intimately related to each other, each contributing its share to the total damage, which total damage is greater than the sum of the agents acting singly. There is what may be termed a reverse synergetic effect.

Much time and effort has been spent in the study and development of systems for counteracting corrosion. Three such systems, generally referred to as cathodic protection systems, are:

A. Sacrificial anodes, such as, zinc or magnesium anodes have been attached to the hull of the ship in the vicinity of the propeller.

B. Magnesium anodes have been attached to propeller hub caps.

C. Inert, energized anodes have been attached to the hull, and grounded to the propeller shaft.

Each of the above methods has inherent disadvantages. For example:

A. Due to the high current demand of a rotating bronze propeller and the oil resistance between the bearings and the rotating shaft, zinc or magnesium anodes attached to the hull do not provide sufficient current to the propeller to protect it. This method is ample in the stationary condition when shaft and bearings are grounded, but it is inadequate for rotating propellers.

B. A sacrificial anode attached to the propeller hub cap places the current where it is most needed, i.e., directly coupled to the propeller, but has the disadvantage in the fact that the amount of sacrificial material, magnesium, that can be used is limited by the space available. Therefore, the total current capacity of such a system is inadequate to protect a rapidly moving bronze propeller for a sufficient period, even though supplementary zinc or magnesium anodes be used on the hull. Further, the uneven wear on a sacrificial anode attached to a propeller hub produces undesirable turbulence and possible vibration.

C. An inert, energized anode on the hull is a step in the right direction in that sufficient current can be supplied to the propeller. Its disadvantage lies in the stray current damage to the struts and to the hull that occurs because these structures are positioned in the direct path of the current.

While much study has been given to the cause and effect of cavitation, so far as applicants are aware, no practical solution to the problem has up to now been developed. Increasing evidence from many sources indicate that the so-called mechanical aspects of cavitation damage may be influenced by electrochemical passivation of the metal surface on which cavitation action is occurring.

The term cavitation as applied to a fluid may be defined as the formation of cavities in regions of reduced pressure. Fluids moving across hydrofoils, such as propeller blades, form vapor bubbles at high velocity, low pressure areas. These vapor cavities are caught in the moving fluid and collapse downstream on areas of high pressure. The impingement forces of these collapsing bubbles are so great, several hundred atmospheres per square inch have been reported, that they literally gouge particles from a metallic surface. This is the phenomenon of cavitation damage. The inception of cavitation is enhanced by the presence of sub-microscopic nuclei of vapor or undissolved gases. The formation and growth of these vapor bubbles, which is akin to boiling of water at reduced pressures, is a function of the external pressure, vapor pressure, mass density of the fluid and its velocity.

The mechanical approach to cavitation damage attributes the extent of the damage to the physical properties of the metal. Experimenters have shown that cavitation damage decreases with increased hardness, workhardening, tensile strength to a lesser extent, and fatigue resistance. Other physical factors which support this mechanical approach are that cavitation damage decreases with grain size and number of inclusions in metals, and the fact that elastomeric coatings such as certain neoprenes are resistant to cavitation damage.

In more recent years new insight by other investigators have proposed that chemical and electrochemical phenomena may account for some of the factors related to cavitation damage. The fluid composition, such as sea water compared to fresh water, has a marked effect on the cavitation damage to steel and other metals. There is much inconsistency in the data but there is evidence that materials prevented from corroding by the use of cathodic protection, have increased resistance to cavitation damage.

Certain aircraft carriers, for example, are now operating near or above design operating speeds to keep pace with increased demands made by operational jet aircraft. These excessive propeller speeds are causing severe cavitation damage to the propellers. Periodically, the propellers are removed from the ship and are repaired in the shops by weld overlays on the damage areas. The damage is generally concentrated at the base of the blade adjoining the hub extending in a patch about one foot across the blades by six inches wide. Depth of penetration has exceeded 1½". The problem in war time, when propeller repair can not be accomplished at optimum fixed intervals, could conceivably reach a point where damage at these highly stressed blade areas would cause the loss of blades at sea.

In accordance with this invention, applicants have produced a propeller anti-cavitation system which has been designed to provide electrochemical protection to the propeller during operation. The current densities used to protect the propeller are 30 to 50 times that required for hull cathodic protection systems. The inventive concept behind this was not only to apply sufficient current to polarize the propellers and protect against corrosion but to apply current in excess in order to produce a hydrogen film on the propeller surface which would mechanically interfere with the collapsing vapor bubbles which produce the cavitation damage. This hydrogen layer, intact or partially formed, forms nuclei of trapped compressible gases within the cavitation vapor bubble which reduces the force of collapse by cushioning. This cushioning phenomenon also plays an important part in reducing cavitation noise.

The design of this system electrically separates the shaft and propeller from the remainder of the hull and supplies automatically regulated current, properly divided into the required predetermined current densities, to the propeller and hull. The current required for the propeller is a function of propeller rotational speed, and that for the hull is a function of ship speed. Special long life inert anodes, mounted either on the propeller hub, on the propeller after strut or on the stern over the propeller tips, supply the required protective current from rectifiers located within the ship.

Since electrically separate paths are required for the propeller shaft assembly and the hull, several precautions have to be taken. Where anodes are mounted on the strut arm, the strut is coated with an insulating dielectric material such as glass reinforced epoxy resin. In the case of hull mounted anodes, dielectric rubber or plastic patches or shields are required on the hull. Also, the chances of potential differences occurring between the shaft journals and bearings are great, which could cause localized circulating corrosion currents between the members. As a further precaution the exposed metal lands between all water lubricated bearing staves are covered with cemented rubber strips mechanically held by plastic backing pieces. Rotating shafts of merchant vessels generally isolate themselves from the hull because of the floating action of the shafts on a film of oil. This is also true of naval ships provided that the conventional semi-metallic shaft seal packings are replaced by plastic or flax types. In some instances, where the propeller shafts drive auxiliary gear, such as turbine bearing lubricating oil pumps, it may be necessary to electrically isolate the shaft by providing plastic spacers and sleeves around bearing pedestal bolts aft of the first inboard flange and insulating the flange face itself.

Returning to corrosion, at least 90% of all metal corrosion taking place in environmental conditions normal to man can be explained by the electrochemical theory of corrosion. In this theory, metal atoms react with their environment, which always includes water, to form metal ions and to release electrons. For a divalent metal, the corrosion reaction at the anode is represented thus:

(1) $M^0 \rightarrow M^{++} + 2e$ (2) $M^{++} + 2OH^- \rightarrow M(OH)_2$ (3) $M(OH)_2 \rightarrow MO + H_2O$ As can be seen, Reaction 1 releases electrical energy in the form of the two electrons.

In an environment, such as sea water, which is corrosive to most metals, it is possible to have a turbulent condition in which metal disintegration occurs both through cavitation and through corrosion. In sea water it is known that cathodic protection properly applied to a metal can eliminate or greatly reduce that portion of the damage attributable to electro-chemical corrosion. In cathodic protection, the metal under protection is made the cathode in an electric circuit. There are several reactions that may occur at the cathode, which are expressed as follows:

(4) $H^+ + e \rightarrow H^0$ (5) $2H^0 \rightarrow H_2\uparrow$ or (6) $2H^0 + \frac{1}{2}O_2 \rightarrow H_2O$ The protection achieved against corrosion is generally accredited to Reaction 4. Here atomic hydrogen forms as an absorbed layer over the surface and as long as it is continuous no corrosion occurs. This situation is frequently referred to as "polarization." Reaction 5 occurs whenever the hydrogen overvoltage of the metal is reached. Reaction 6 represents the depolarization of the hydrogen film by oxygen.

The prevention of corrosion of metals by cathodic protection is associated with the use of a relatively low order of current density; namely, about 10 ma./ft.$^2$ or less for quiescent sea water, and varying with the metal. The current requirements increase with velocity and again vary with the metal under consideration. Only a few exact values have been established for velocity conditions and considerably fewer are available in published literature. However, it has been established that corrosion protection can be achieved with many metals at velocities encountered in every day use, such as in flumes, large pipelines and the hulls of moving ships. Most of these structures are designed to avoid turbulent flow, hence cavitation effects are negligible. For example, a painted naval ship in service for one year requires a current density of about 2 ma./ft.$^2$ for cathodic protection under stationary conditions and about 5 ma./ft.$^2$ under velocity conditions of 20 knots.

Applicants have discovered that the distruction of metal in sea water, or other electrolytes, by the combined reaction of corrosion and cavitation can be prevented by the proper application of an electric current to the metal.

The reaction at the cathodic and that responsible for reduction of electrolytic corrosion, was shown previously in Reaction 4. As long as the metal is polarized with the atomic hydrogen film no electrolytic corrosion can occur; metals, such as aluminum and lead, subject to alkali corrosion, excepted. The voltages and the current densities necessary to achieve this situation may vary with velocity, temperature, time, composition of electrolyte, availability of oxygen, geometry of the structure or object and each individual metal or alloy, but all evidence points to the conclusion that cathodic protection can be achieved at a specific current density for each condition. The values may vary from less than 10 for metals under stationary conditions to many hundred ma./ft.$^2$, for bare metals under high velocity conditions.

Up to the present, it has been the opinion of scientists in the corrosion field that all of the current in the cathodic reaction that went into the production of molecular hydrogen, as previously illustrated in Reaction 5, was wasted in as far as achieving protection was concerned. This is undoubtedly still correct for electrolytic corrosion in that the current utilized to produce hydrogen is in excess of that required for cathodic protection, but herein lies a scientific principle that has been overlooked in the past; that is, the use of molecular hydrogen in cushioning the damaging effects of the collapsing bubble produced by cavitation or by providing nuclei for the onset of cavitation and thus confine the discrete cavities to these nuclei.

One method, proposed heretofore for reducing cavitation damage and noise, has been to introduce a stream of air bubbles from an external source into the area of cavitation inception. The difficulty with this air bubble method has been to maintain the introduced air bubbles at the proper locations on the surface of the propeller. This is a very real difficulty from the practical standpoint, and so far as applicants are aware has not been successful.

By the electrical generation of bubbles of hydrogen gas on the cavitating metal surface of the propeller, in accordance with the instant invention, the cushioning bubbles are formed and maintained exactly where they are needed, and therefore, a much smaller quantity are needed to perform effectively. The prevention or reduction in cavitation damage then becomes a matter of the generation of hydrogen bubbles in the proper volume to combat the severity of the cavitating condition. The minimum current density required for the release of hydrogen for this purpose varies from less than 10 ma./ft.$^2$ for stagnant water conditions to several thousand ma./ft.$^2$, the upper limits of which are fixed by the rate of hydrogen depolarization and physical removal by turbulent water flow. Above the minimum, the release of hydrogen varies proportionately to the applied current density.

For example, in cavitation protection experiments conducted at California Institute of Technology under sponsorship of Office of Naval Research, United States Navy, it was shown that cavitation damage was considerably reduced at current densities of 70 amperes/ft.$^2$ of test specimen surface. This extremely high current density was required for these accelerated high intensity cavitation tests. Experiments conducted at the Boston Naval Shipyard on a model cavitating propeller showed that under simulated operating conditions, a propeller was completely protected from cavitation and corrosion damage at current densities of 500 ma./ft.$^2$ of propeller surface. An actual installation of a propeller cavitation protection system on the U.S.S. Lexington (CVA 16) utilizes propeller current densities of 300–400 ma./ft.$^2$ for protection, and, with this installation, reference electrode measurements of propeller potentials indicate that hydrogen gas is being generated in the desired quantity for cavitation protection.

The hydrogen gas is formed by Reaction 5 which comes about when sufficient voltage is applied to the propeller, above the over-voltage of hydrogen, to cause the monatomic hydrogen atom absorbed on the surface of the propeller to combine as a diatomic gaseous molecule which then bubbles off the surface as a gas. This release of hydrogen gas is another form of depolarization of the cathode, but in this case the reaction rate because of overvoltage is greater than the diffusion rate of oxygen for depolarization, as given in Reaction 6. Thus the hydrogen evolution process maintains the metal surface in a protective cathodic condition while simultaneously providing gas cushioning, as described above.

The principal object of this invention is to provide a method for electrically preventing corrosion-erosion-cavitation damage on propellers of naval and merchant ships. The corrosion aspect of the damage is countered by cathodic protection means, while erosion-cavitation, the mechanical aspect of the damage, is countered by the electrolytic evolution of hydrogen gas on the surface of the propellers. The reduction of cavitation damage is accomplished by the use of a high current density cathodically impressed on the propellers. Some portion of the total current of the system is diverted to the hull by proper internal circuitry for general overall corrosion protection to the stern of the ship.

Another object of this invention is to provide a method of impressing a high current density on a ship's propeller.

Another object of this invention is to provide a method of dividing the high current density between the propeller or propellers and the hull.

Another object of this invention is to provide a method of proportioning the division of current applied to the propeller and hull responsive to rotation of the propeller shaft.

Another object of this invention is to provide a new and efficient circuit for impressing high current density on a ship's propeller.

Another object of this invention is to provide a novel hub cap for ship's propellers incorporating an efficient anode for distributing current to the propeller.

Another object of this invention is to provide a novel connection for supplying current from a source within a ship to an anode without the ship.

Another object of this invention is to provide a novel flange and slip ring assembly connecting two portions of a propeller shaft and for conducting current into and through the shaft.

Another object of the present invention is to a novel shaft bearing structure for insulating the shaft from the bearing.

Generally, in accordance with this invention, the positive side of a direct current source from suitable rectifiers located in the machinery space is fed to an anode mounted on an insulated fairwater cap of each propeller or to a strut mounted anode on the trailing edge of each main strut arm or to anode clusters located on the external shell above each of the propellers.

In the preferred embodiment, wherein the anode is mounted on a fairwater cap attached to the propeller hub, the electrical connecting lead is positioned inside the axial bore of the propeller shaft and connects to the positive pole of a rectifier within the ship through a special type of flange insulated slip ring assembly. The current from the anode enters the seawater path and flows to the propeller and thence through the shaft and is returned to the negative side of the rectifier through a second appropriate slip ring and brush assembly on the shaft. The current output to the propeller is regulated by the speed of shaft rotation by means of a controller within the ship. A predetermined portion of the return current is diverted to the hull by grounding the negative terminal of the rectifier through an appropriate variable resistor.

In cases where natural shaft isolation is not achieved during rotation, provisions must be made to isolate the shaft at the first inboard flange coupling by means of plastic spacers, sleeves and washers, and all bearing pedestals located aft of the flange must be isolated in the same manner. In all cases the stern tube packing materials must be a dielectric insulator such as flax or plastic combinations; semimetallic packings or graphite impregnated packings are not suitable for this purpose. Where flange isolation is required as a precautionary measure, a simple contact switch is installed across the flange faces in such a manner, that an alarm will sound if flange movement relative to each face occurs. A reference electrode, mounded on the hull on the centerline of each shaft under the intermediate strut, monitors the current diverted to the hull by preventing overprotection in the stern area. These reference electrodes are also used for making periodic measurement of hull potential and propeller potential for the ship as may be required. Special hull painting in way of anodes, as well as strut coatings are required for strut and hull mounted anode embodiments. Plastic fairings, rope guards and stave retaining rings are fitted on all outboard shafts. All outboard bearings are specially coated with rubber on their internal land surfaces. Non-metallic packings and coated stuffing boxes, glands and internal stern tube areas are required. Special dielectric shields, mounted on the hull, are required around all anode clusters mounted on the hull.

The anode in the preferred embodiment comprises a special platinum or palladium alloy cladding on a tantalum or titanium basis material or a lead alloy containing silver, molded as a band or cap around a plastic section of a propeller fairwater. One anode is used for each propeller.

In the second embodiment of the inventors an anode rod is mounted on the trailing edge of a plastic covered strut arm. Usually V struts are used for multiple screw ships, therefore two anode rods are fitted to each strut. These strut anodes are mounted by means of insulating bands of plastic material wrapped at spaced intervals around anode and strut. The details of construction of this rod anode are disclosed in applicant's copending applications Serial Nos. 530,647, now Patent No. 2,863,819, and 766,156 now Patent No. 3,038,849, filed August 25, 1955, and October 7, 1958, respectively.

In the third embodiment a cluster consisting of four anodes is located on the shell of the vessel immediately above each propeller. One such anode is a 7" diameter platinum foil properly mounted in a plastic holder complete with stuffing tube for penetrating the hull. For a detailed description of such an anode, reference may be had to the copending application of Preiser et al., Serial No. 631,377, now Patent No. 2,910,419, filed December 28, 1956. An electrical pig-tail lead is provided with each anode, for electrical hook-up to the rectifier. Each cluster of anodes is mounted on a neoprene dielectric blanket extending about 10′ radially from the outermost edge of the cluster.

In each of the several embodiments, a single reference electrode is located on the shell directly under the intermediate strut on each shaft centerline. One electrode per shaft is required. The reference electrode is a circular, plastic holder containing a silver element which is wired into the ship through a stuffing tube assembly. For details of construction of the reference electrode assembly, reference may be had to applicant's copending application Serial No. 675,502, now Patent No. 2,910,420, filed July 31, 1957.

The anodes are powered from a D.C. source located within the ship. A single rectifier can be utilized to power all anodes installed, but in the case of multiple-screw ships, one rectifier is generally used to supply current for two propellers in order to keep their size down. Rectifier voltages and current outputs vary with the size of the installation but usually it is practical to design power supplies for this purpose based on 2 or 3 amperes per volt.

A controller is provided to regulate current to the propeller as a function of speed. In the example shown in the illustrated embodiments, a simple two step relay controller is shown for simplicity. Provisions are also made to have the hull mounted reference electrode provide a signal to operate a galvanometer relay to reduce current output of the system in the event of over-protection of the hull. Further refinements in control of current can be made by having a shaft speed electrical indicator properly wired to a multi-contact relay.

This relay trips a series of finger contacts in an ordered manner from the strength of a current signal fed to a magnetic coil. The current signal, taken from the shaft speed indicator is a function of speed. The signal relay is wired to suitable circuit relays which control the number of primary windings on a tapped power transformer feeding the rectifier. This is a step type controller common for many industrial applications. Other types of controllers consist of servo operated Variac transformer, wherein the position of the servo control is determined by a voltage signal generated by the shaft speed indicator. This positioning method adjusts the Variac to the required rectifier input voltage to obtain a current output corresponding to a given shaft speed. Other designs considered are magnetic amplifier controls in which the voltage signal generated across the shaft speed indicator controls a saturable core reactor through suitable amplifier staging, which in turn regulates the primary voltage of the power transformer feeding the rectifiers. This arrangement has no moving parts other than the mechanical linkage between propeller shaft and speed indicating generator. One slip ring, mounted on each shaft is required for the installation which utilizes the hull or strut mounted anodes. The fairwater mounted anode requires two slip rings on of which is incorporated in the insulated flange assembly. The slip ring, complete with brush assembly, connects to the negative pole of rectifier.

A simple mechanical contactor alarm system may be installed on the insulated flange of the shaft. The purpose of this alarm system is to warn of any axial or torsional shaft movement of the isolated shaft during ship operation and is only included as a safety measure.

Where shaft isolation is required the propeller shaft is electrically isolated from its line shaft at the first inboard flange coupling in the machinery space. This electrical isolation is accomplished by means of plastic spacers and sleeves installed under the pedestal steady bearings located aft of the flange coupling under consideration. The flange coupling is prepared for isolation by wrapping a portion of the tapered flange bolts which have been machined undersized, with a glass reinforced polyester resin. Final machining to size is required. The flange faces and faying surfaces under the flange nuts are separated by thin glass reinforced plastic sheet material. The electrical alarm is fitted across this insulated coupling to sound a warning should shaft movement occur in service.

All salt water rubber staved bearings are specially coated on the exposed internal land surfaces of the bearing shell. Molded rubber sheet material is cemented to the land surfaces and then mechanically secured with a plastic backing strip attached by plastic bolts. The ends of the shells are also coated with sheet rubber material. Special precautions for sealing must be taken where the bearing halves assemble. Plastic stave retaining rings are fitted in place of conventional metallic rings.

No metallic stern tube or bulkhead shaft packings may be used. Flax, "ramie," or equivalent packings are required. All internal surfaces of stuffing boxes and glands are coated with a suitable epoxy resin. Special painting is required on the internal surfaces of the stern tube, extending three feet from each end of the forward and after bearings. All outboard shafts are fitted with glass reinforced plastic bearing fairwaters and rope guards. An epoxy resin material is used for the plastic because of its good resistance to the alkali reaction products.

The main struts of the ship, especially for strut mounted or hull mounted anode systems are coated with a lay-up glass reinforced epoxy coating. The hull area in way of the hull mounted anode clusters is painted with a 20 mil standard Navy vinyl system. The rubber shields, which are mounted first, may be painted in the same way. The anode and reference electrode assemblies are mounted after painting is completed.

The system, in accordance with this invention, differs from and is an improvement over the sacrificial anode methods either on the hull or on the propeller hub, described hereinbefore, in that, a controlled impressed current is used instead of an uncontrolled galvanic current. The ability to increase the current when the deterioration rate is high and decrease it when the rate is low gives the system complete flexibility. When galvanic sacrificial anodes are used on the hull, the actual situation is that the current decreases as the need increases due to the increase in the oil film resistance between rotating parts and the bearings in which they run. It is generally conceded that a rotating propeller is connected to the hull only through a relatively high resistance oil film; high with respect to the nature of the galvanic voltages, which for a zinc-steel couple is in the order of 0.4 volt maximum.

With the instant invention, the major source of the current (anode) is placed on the propeller hub instead of the hull. This localizes the current within the area being protected and assists in achieving good current distribution on the propeller.

When a galvanic anode such as magnesium is attached to the propeller hub cap, the current output tends to remain constant throughout its life. Both the current producing capacity and the life are limited because of the relatively small amount of sacrificial metal that can be attached to the hub cap. Also uneven anode wear can cause shaft vibration. With applicants' arrangement, the amount of current available is limited only by the capacity of the generator or rectifier which can be selected to meet the needs.

The system, in accordance with this invention, differs from and is an improvement over the known method of attaching an inert, energized anode to the hull, referred to hereinbefore, in that, in the prior art systems the propeller and hull are permanently grounded in an attempt to protect both members simultaneously at uniform current densities which is not effective in achieving the desired results.

With the instant invention, the propeller and the hull are isolated from each other or grounded to each other by either a low or high resistance ground as deemed most advantageous. Thus the propeller can be protected as a separate entity against cavitation damage while still cathodically protecting the hull when the ship is moving, or when the ship is at rest cathodic protection can be applied to the propeller and hull in combination. This system also allows the use of a supplemental protective system for protecting large areas of the hull forward of the stern area. The supplemental cathodic protection system for the hull is not a part of this invention and therefore is not described in detail. However for a complete description of such a system, reference may be had to the copending patent application of Preiser et al., Serial No. 631,377, now Patent No. 2,910,419, filed December 28, 1956.

An electric current flowing from one point to another will divide itself through all parallel paths proportional to their conductivities whether this path be through an electrolyte or through metal suspended in the electrolyte. Normally, the resistance of a metal is much less than that of an electrolyte so a current flowing through an electrolyte in which there are metal members immersed will preferentially and proportionately flow through the metal instead of the electrolyte. Where this is a direct current, as is the case where cathodic protection is used, one side or end of the metal will become the cathode and the other the anode. The end that is the cathode will be "cathodically protected" while the end that is the anode will go into solution in the electrolyte in accordance with Faraday's law provided the metal is not inert. This happens to common metals such as copper and iron. The situation outlined is often referred to as the stray current effect. When the anodes are placed on the hull as in the old method where propeller is isolated from hull and a protective current is fed into the propeller, then certain portions of the ship's hull and especially appendages such as the struts holding the shaft bearings conduct part of the current flowing in the electrolyte and are damaged at the anodic areas by the flowing current in the manner previously described.

By grounding the propeller to the hull, whenever the propeller protective system is shut off intentionally or accidentally, assurance is provided against damage that will otherwise occur to the propeller or propeller shaft, due to local galvanic effects and lack of protection. By using a current control mechanism and a dividing resistor, the amount of current supplied is adjusted to meet the need for corrosion and cavitation prevention. By using electrical isolation at a flanged coupling, a means is provided for conveniently bringing the power cable leads from the rectifier into the shaft and thence to the anode. This allows the use of a thin isolator by using a multiconductor cable. A thin isolator is of great advantage since it lessens the power transmission problems between the two shaft sections, and does not disturb normal dimensions and tolerences.

Other objects and many of the attendant advantages of this invention will be readily appreciated as the invention becomes better understood by reference to the following detailed description when considered in connection with the accompanying drawings in which like reference numerals designate like parts throughout the several views thereof and wherein.

Figures 1, 10:
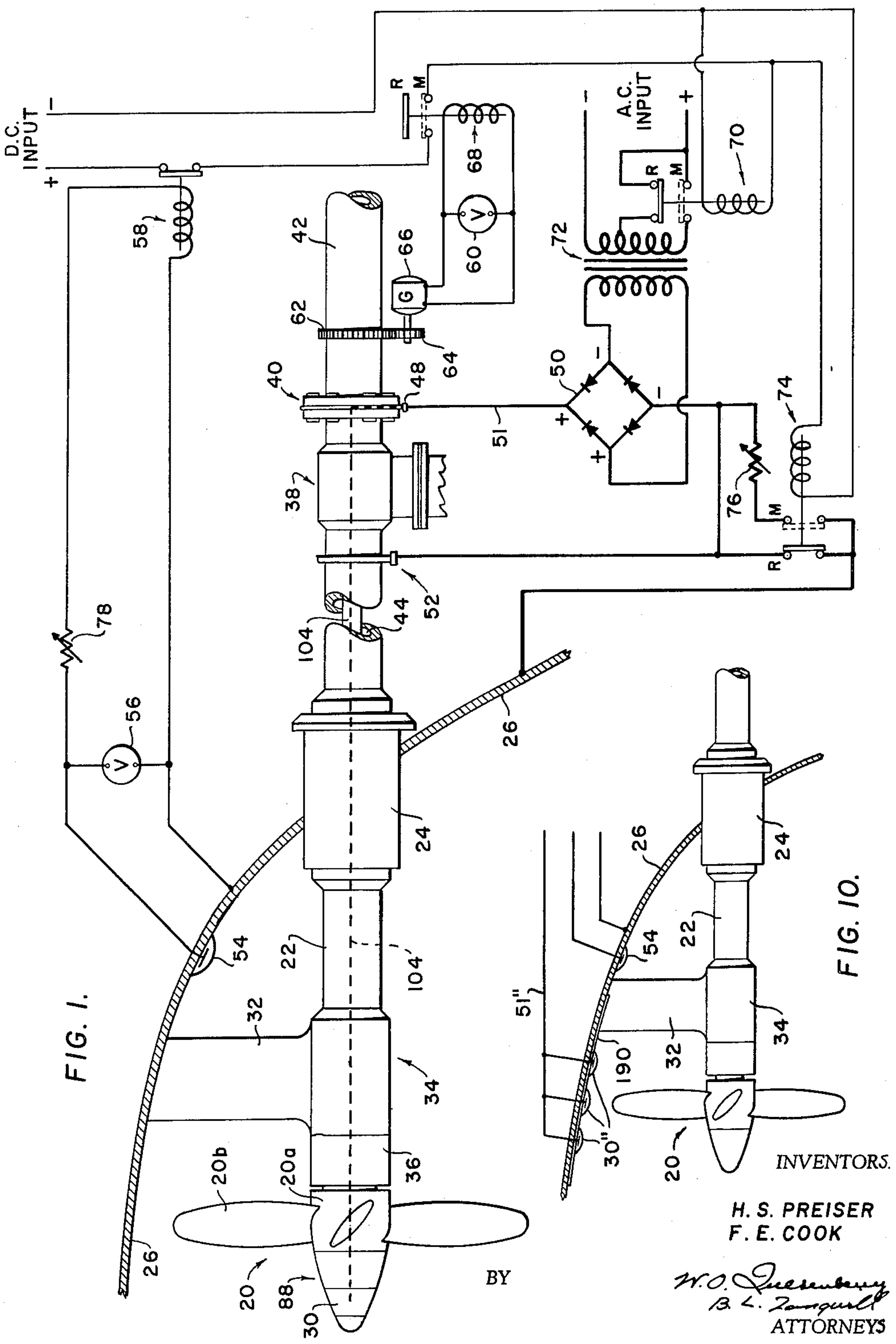
FIG. 1 is a schematic elevational view of a ship's propeller and shafting, with a portion of the stern hull in vertical section, and illustrating a wiring diagram for impressing a high current density upon a hub-mounted anode in accordance with a first and preferred embodiment of the instant invention.
FIG. 10 is a partial schematic elevational view, similar to FIG. 7, and illustrating a third embodiment of the invention wherein a cluster of anodes is mounted on the hull above the propeller.

Referring now to the drawings, first to FIG. 1. As shown in FIG. 1, a preferred embodiment of the instant invention is applied to a conventional, screw propeller 20, comprising a hub **20*a* and integral blades 20*b*. The propeller is keyed and bolted to a tail shaft 22 which enters a stern tube 24 through an aperture in the hull 26 of the ship. The propeller hub is fitted with a fairwater cap 88 adapted to receive an inert anode 30. The anode, described in detail hereinafter, is fabricated of a platinum or platinum-palladium alloy clad on a tantalum or titanium base. The shaft 22 is supported externally to the hull by a strut arm 32 to which is attached a rubber staved bearing assembly 34. As described hereinafter, the strut arm is plastic coated. A plastic rope guard 36 is attached to bearing housing 34. The tail shaft 22 is generally covered with rubber or like dielectric on portions exposed to the sea. A stern tube gland 24*a***, containing a non-metallic packing (not shown), seals the rotating shaft from sea water leakage into the ship.

The shaft 22 is supported by pedestal bearings 38 inside the ship, only one of which is shown, which bearings may be purposely insulated from their supports if required but normally these bearings are naturally insulated from the shaft due to oil films formed between the bearings and the shaft during rotation of the shaft. The tailshaft 22 is connected by an insulated flange coupling and slip ring assembly 40 to a line shaft 42 which is then connected to the ship's engine (not shown). An axial bore 44 in shaft 22 contains an anode lead conductor 104 which connects anode 30 to the insulated flange coupling and slip ring assembly 40, described in detail hereinafter. A brush 48 assembly rides on the slip ring and is electrically connected to the positive side of a rectifier 50. The negative side of the rectifier returns to the shaft via a grounded brush and slip ring assembly 52.

A reference electrode 54 is fitted on the stern portion of the hull forward of the strut for purpose of preventing over protection of the hull areas. This reference electrode, which may be formed in accordance with the disclosure of the copending patent application of Herman S. Preiser, Serial No. 675,502, now Patent No. 2,910,420, filed July 31, 1957, registers the hull potential through a high resistance voltmeter 56 which is wired in parallel with a galvanometer relay 58. When the hull voltage is above a predetermined amount, for example 0.80 volt, the current flowing in the galvanometer relay 58 causes the D.C. power line to the other relay control circuits to open. The control of current to the anode 30 is made by a shaft speed indicator 60, which indicator comprises a specially calibrated voltmeter. A ring gear 62 is mounted on shaft 42 and engages with a plastic driven gear 64 which causes a small generator 66 to rotate. The voltage produced by generator 66 is proportional to the speed of rotation of the shaft and is indicated directly on the specially calibrated voltmeter 60. In parallel with the voltmeter is a relay 68 which is normally in the R or open position while the ship is at rest or moving slowly up to about 25% of its speed. When this condition prevails, a second relay 70 is in such a position R that the tapped primary side of a power transformer 72 is operating at about 20% of full capacity. Also a third relay 74 is in such position R as to directly ground the tail shaft to the hull. In this condition, current from anode 30 supplies moderate cathodic protection to both the hull and the propeller and relay 58, controlled by reference electrode 54, is in closed position.

As the ship increases speed, the generator 66 increases in voltage which causes relay 68 to trip into position M. This closes the relay power circuit which causes relay 70 to move to M position which changes the primary taps on power transformer 72 to full power. Simultaneously, relay 74 closes to M position which places a variable or dividing resistor 76 in the grounding line between the hull and the tail shaft. Since shaft 22 is isolated from the ship, all negative return current from the hull must flow through resistor 76. By proportioning this variable resistor, 90% of the total current available is made to flow through the anode and the sea water path to the propeller blades for cathodic cavitation protection of the propeller, and about 10% is allowed to flow to the hull for cathodic protection of the stern, which latter current prevents stray current damage and other corrosion damage to the hull.

Thus, it is seen that a high current density is maintained on the propeller for protection against corrosion and cavitation damage, while the hull is protected from corrosion and stray current damage at much lower current densities. In the event that too much current is flowing to the hull, such as to cause relay 58 to open, then resistance 76 can be manually readjusted to reduce current flow to hull. A variable resistance 78 in the reference electrode-over-protection circuit, can adjust the current flowing to relay 58 to cause the D.C. power circuit to open at any predetermined hull voltage. The type of control illustrated schematically is a simplified two step control, however as described previously, continuous stepless control can be provided where desired. Also the division of current applied to the propeller and to the hull may be varied from the 90–10 values given above, depending upon operating characteristics of the propeller and ship.

Figure 2:
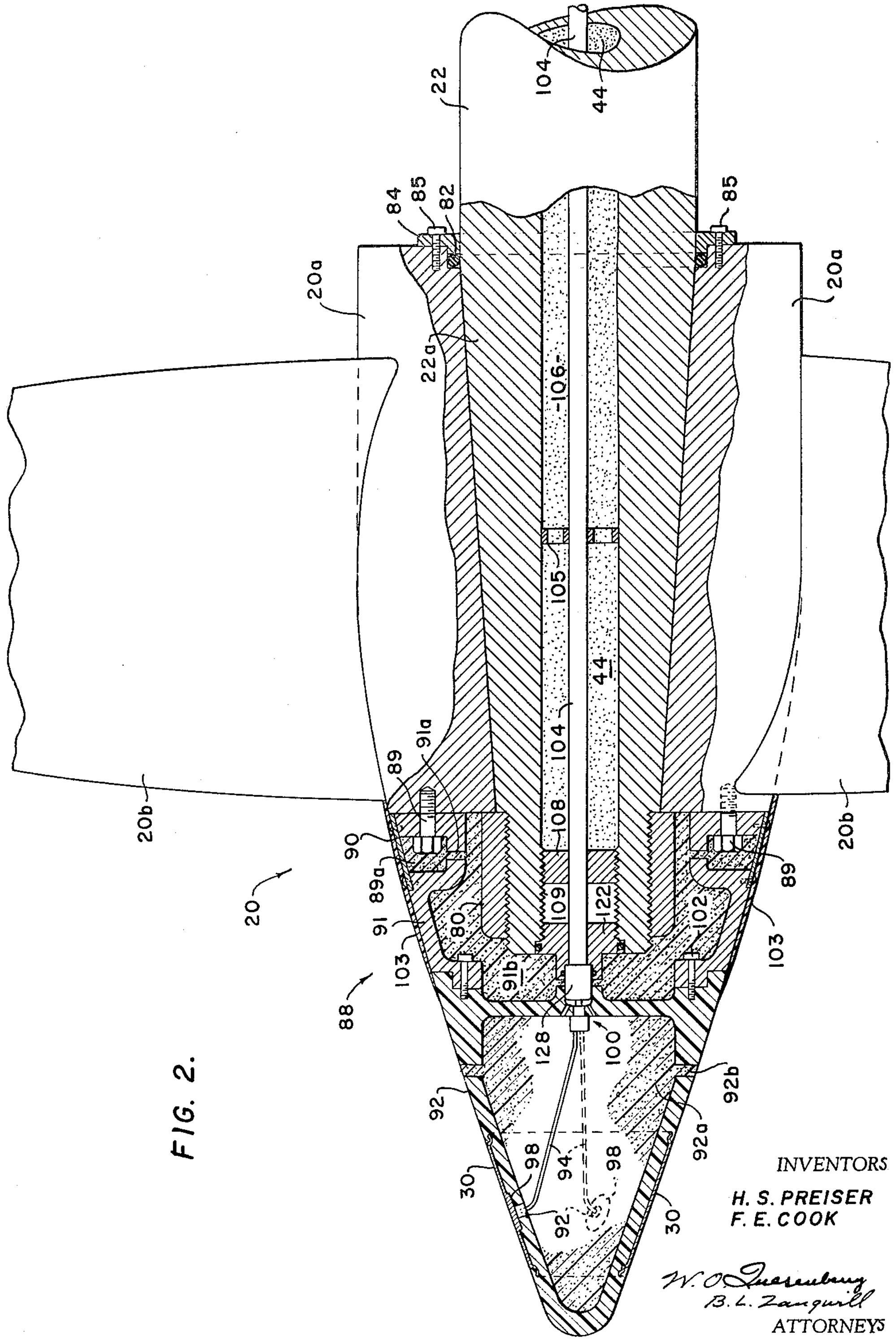
FIG. 2 is a detailed longitudinal sectional view through the propeller cap and hub of FIG. 1, illustrating the novel anode mounting and electrical connections in accordance with the first embodiment of this invention.

Referring now to FIG. 2, the propeller hub **20*a* which supports blades 20*b* is keyed to the tapered section 22*a* of tailshaft 22 and secured in place by a propeller nut 80. A seal ring 82, held in place by gland 84, and bolts 85, prevents sea water from entering the mating tapered surfaces of the shaft and propeller hub. Shaft 22 has an axial bore 44 extending throughout its entire length. The conical fairwater cap 88 is fastened to hub 20*a* of the propeller by means of recessed bolts 89. The recesses are covered with plates 90 to maintain streamlining. The hub cap 88 is constructed in two sections 91 and 92. Section 91 is metallic and attaches to the hub, and section 92 is a chlorine resistant plastic such as a glass reinforced polyester resin. Access holes 91*a* are used to fill voids in metal section 91 with a tallow, plastic foam or other dielectric water proofing compound 91*b*. Section 92 carries the anode 30**, which anode, as pointed out hereinbefore, is formed of platinum or platinum-palladium alloy clad on a tantalum or titanium basis metal.

The anode is fabricated as a hollow truncated cone and is suitably embedded in and made flush with the external surface of plastic section 92 of the hub cap. Three anode leads 94, made of tantalum or titanium rods, are welded to knurled insert pieces 96 which in turn are welded to uniformly-spaced backing pieces 98, fused to the anode. Three rods (only two of which are shown) are used to reduce electrical resistance through the thin anode cone and to insure reliable operation in the event that one rod fails mechanically during shaft rotation. The rods 94 are connected to a suitable connector 100, which is detailed in FIG. 3, referred to hereinafter. The void space within plastic section 92 is filled with water-proofing mastic sealing or a unicellular plastic foam such as an isocyanate or polyurethane. Section 92 of the cap is made up as a completed assembly containing the anode 30, lead rods 94 and connector 100 and is bolted to the metallic section 91 by means of bolts 102.

The external surfaces of the metallic section 91 of the cap are coated with a glass reinforced epoxy resin or other alkali resistant coating 103. The anode connector 100 is attached to the insulated conductor 104 located centrally within the axial bore 44 of the tail shaft, 22. A series of plastic spacers 105, each of which is open for passage of vibration-dampening sand 106, centers conductor 104 with the bore 44. The entire space between the bore and the conductor is filled with sand 106 for dampening shaft noise and vibration. A sand compacting plug 108, which is threaded into internal threads 109 in the shaft bore, compacts the sand when tightened.

Figure 3:
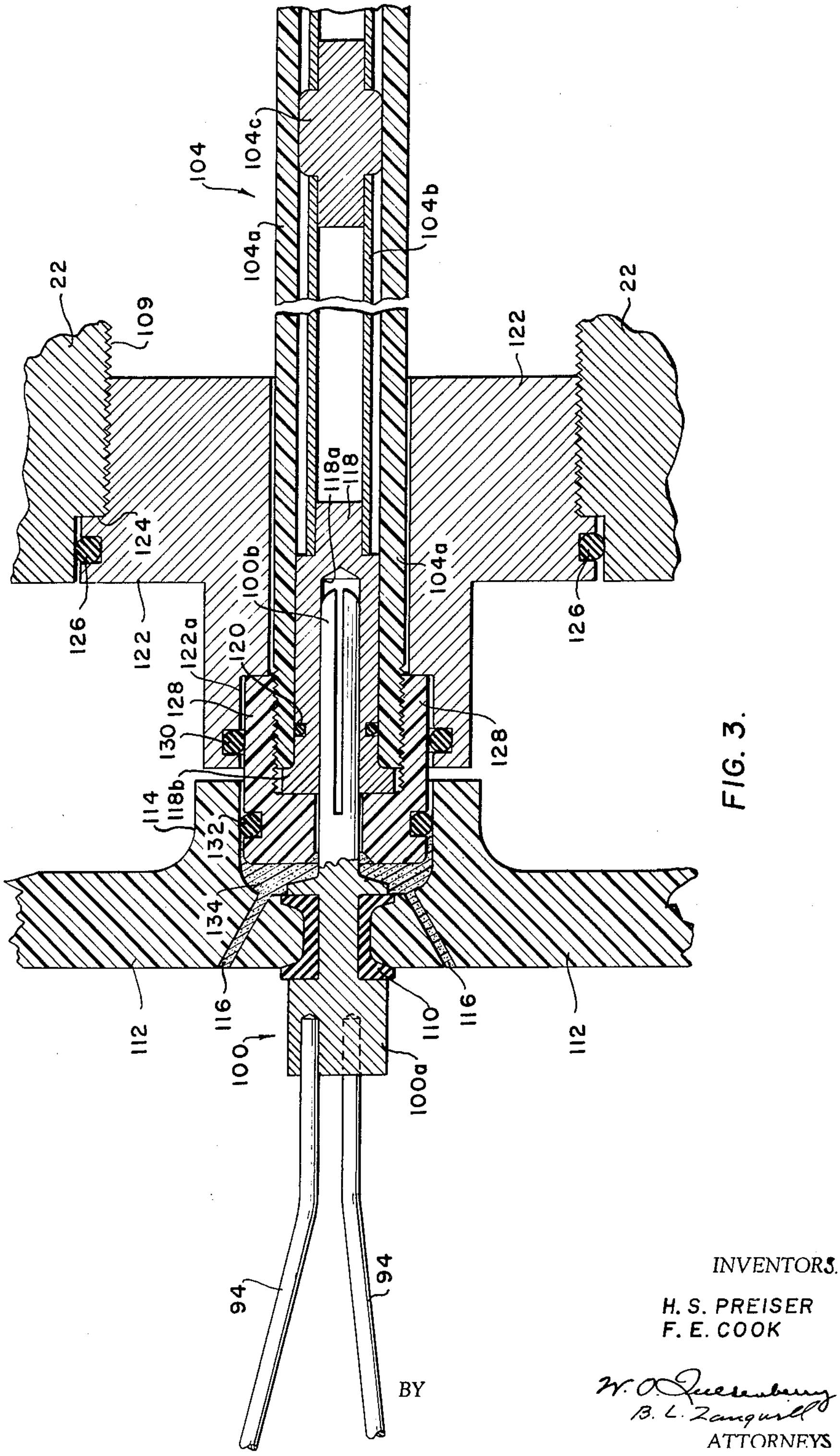
FIG. 3 is a longitudinal section view, showing in detail the electrical connection between the hub-mounted anode and the aft end of the propeller shaft.

Referring to FIG. 3, the three rods 94 (only two of which are shown) are welded or otherwise securely fastened in uniformly-spaced openings in one end **100*a* of connector 100, the opposite end of which connector terminates in an electrical prong 100*b*. Connector 100 is made of tantalum or titanium and is sealed flexibly for centering purposes by means of a silicone or chloroprene rubber grommet 110. The plastic section 92 of fairwater cap 88 has an end wall 112 constructed with a central recessed boss 114 in which vent holes 116 are drilled. The central conductor 104 comprises a plastic tube 104*a* made of polyvinyl chloride and in which there is concentrically spaced a copper tube 104*b*. In an actual installation, ¾" IPS PVC plastic tubing was used with ½" O.D. copper tubing. In order to prevent eccentric movement of the copper tube inside the plastic tube, copper centering spacers 104*c* are inserted about every four feet and brazed to each end of the continuously connecting copper tube 104*b***.

The after end of the conductor **104*b* is fitted with a tantalum or titanium plug 118 which has been drilled with a hole 118*a* to mate with the male end 100*b* of connector 100. The female plug 118 is sealed against the concentric plastic tube 104*a* by means of an O ring seal 120**.

This entire conductor assembly is brought through a modified shaft plug 122 which is externally threaded to fit into the threaded bore 109 of the tail shaft 22. A shoulder 124 and O ring 126 seals the external surfaces of plug 122 to the shaft. Plug 122 is drilled with a recessed shoulder **122*a* to receive a plastic seal cap 128 for terminating the central conductor 104 through shaft 22. The seal cap 128 is threaded to the plastic tube 104*a* and when tightened in place holds female connector plug 118 in place. Female connector plug 118 terminates in a flange 118*b*. Cap 128 is sealed from an internal bore 122*b* of shaft plug 122 by means of an O ring seal 130. When assembling the fairwater cap 88 to the propeller hub (FIG. 2), the recessed boss 114 on the bottom wall 112 of section 92 slides over cap 128 and is sealed by an O ring 132. Prior to assembly, a waterproof insulating mastic 134 is smeared over the aft end of cap 128 and excess mastic is squeezed into holes 116 upon assembly. After bolting hub cap assembly 88 to hub 22*a*, the voids are filled with waterproofing compound 91*b* through bores 91*a***.

Figure 4:
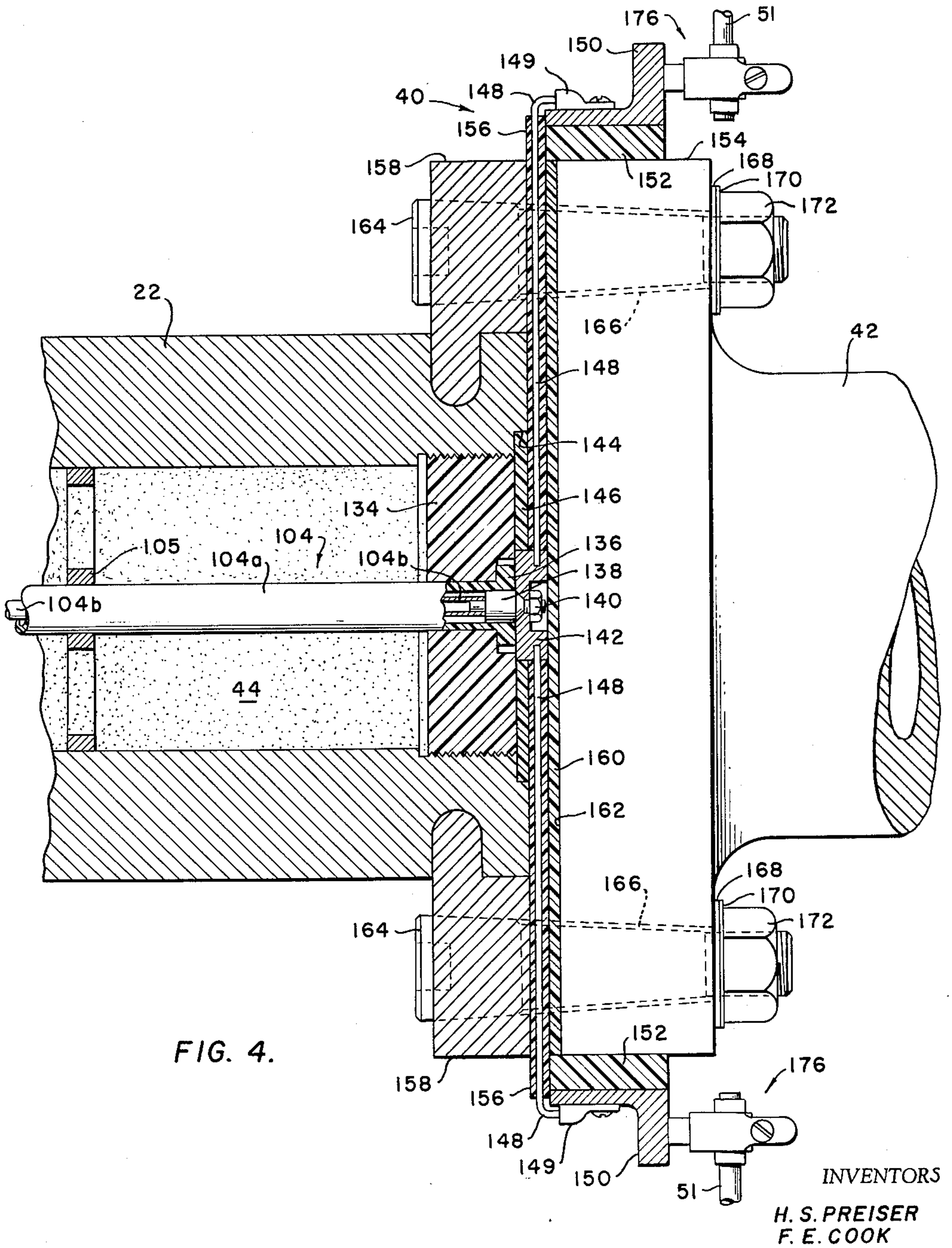
FIG. 4 is a longitudinal sectional view, partly in elevation, illustrating the novel slip ring and insulated flange connection between the forward end of the propeller shaft and the aft end of the line shaft, in accordance with the FIG. 1 embodiment of the invention.

Referring now to FIG. 4, the forward end of the insulated conductor 104 terminates in the flange coupling and slip ring assembly 40 that couples the tail shaft 22 to the line shaft 42. The conductor 104 is brought through a hole in a forward shaft plug 134, which plug is fabricated of a high impact polyvinyl chloride plastic. The outer insulated tube **104*a* is anchored to shaft plug 134 by means of a recessed threaded plastic collar 136. The end of the copper conductor tube 104*b* is fitted with a copper plug 138 brazed to the tube. The end of the plug 138 is threaded to receive a jamproof nut and lockwasher 140. A copper conductor collar 142 is fitted over plug 138 and anchored securely, mechanically and electrically, by the lockwasher and nut 140, which lockwasher and nut fit within a recess in the copper collar 142**.

The forward end of shaft 22 is recessed so that when shaft plug 134 is tightened in place a smooth recess 144 is formed and a plastic disc 146 is fitted into this recess. Four copper conductors 148 are brazed at one end to the copper conductor collar 142 and are connected at their opposite ends by connectors 149 to a bronze slip ring 150. The slip ring is mounted on an insulating ring 152 which is mounted on the perimeter 154 of the flange coupling. The slip ring 150 is split and assembled by bolting both halves together by suitable lugs and bolts, not shown. The conductors 148 are fitted into insulated plastic tubes 156 which are held in place by grooving a thrust ring 158 attached to shaft 22. A plastic end plate 160 is attached by countersunk screws (not shown) to flange face 162 and insulates tail shaft 22 from line shaft 42. The thrust ring collar 158 is a split ring put together by bolting (not shown) which is then shrunk fit to the shaft 22. The removal of the thrust collar permits shaft 22 to be withdrawn from the ship. The thrust collar and flange coupling are bolted together by tapered bolts 164, which bolts may be insulated from the flange by recessing and undercoating the taper in contact with the flange coupling and coating with a glass reinforced plastic 166, machined to fit. An insulating washer 168 is fitted under a regular metal washer 170 before tightening nuts 172.

In assembling the hub anode assembly, the anode 30, backing pieces 98, insert pieces 96, rods 94 and connector 100 (FIG. 2) are welded or brazed together as an electrically continuous unit and the grommet 110 (FIG. 3) is stretched in place over the connector. This subassembly of the anode is then positioned in a suitable mold and the plastic fairwater section 92 is molded to incase the anode subassembly as shown in FIG. 2. Cold cure, hand lay-up reinforced polyester laminating techniques are generally used, but in production, pressure molding techniques using polyvinyl chloride or copolymers of butadiene, styrene and acrylonitrile may be used. The plastic section 92 is then bolted to metal section 91 by bolts 102 and the assembled fairwater cap 88 is put aside. The tail shaft 22 is next readied to receive the central conductor 104. The copper tube **104*b* is assembled with spacer pieces 104*c* on four foot intervals to the correct length. Female connector 118 (FIG. 3) is assembled and brazed on the after end of the copper tube 104*b*. The forward copper plug 138 (FIG. 4) is brazed on the forward end of tube 104*b*. The copper conductor assembly is now slipped into the plastic tube 104*a*. The plastic spacers 105 are connected cementing to the outside of plastic tube 104*a* on about 4 foot centers. The tail shaft 22 is separated from line shaft 42 by pulling the tail shaft outboard. The insulated conductor assembly 104 is slipped into the shaft bore 44** from the after end.

Going into the ship, the plastic plug 134 (FIG. 4) is fitted over plastic tube **104*a* and is screwed in place, and the plastic collar 136 is screwed down into the recessed shoulder on plug 134. Plastic spacer 146 is bolted in recess 144 in the tail shaft and is fitted flush to the recessed plug 134. The grooved thrust ring 158 is fitted to the forward end of tail shaft 22. Next conductor collar 142, to which is assembled conductors 148 sheathed in insulating tubes 156, is secured to plug 138 by means of nut and lockwasher 140 which are recessed in the plug. The conductors 148 and sheaths 156 are positioned in grooves cut in thrust ring collar 158. End plate 160 is secured by countersunk bolting (not shown) to the face of flange 152. The flange is also fitted with the slip ring 150, which is mounted on the insulating ring 154. The split construction of the slip ring permits easy assembly. The two flange faces of the coupling are now moved together and secured with the insulated tapered bolts 164, as shown in FIG. 4. The conductors 148 are soldered or brazed to connector lugs 149 which are fastened to slip ring 150. A pair of brush assemblies 176 ride on the slip ring and are connected by a conductor 51 to the positive side of the rectifier 50** (FIG. 1).

Returning to the aft end of the tail shaft (FIG. 2), the propeller hub **20*a* is secured to the tapered tail shaft 22 by nut 80. The space between the shaft bore and conductor 104 is now filled with sand 106 and packed in place by tightening compacting nut 108. The after shaft plug 122 (FIG. 3) is screwed into place with ring seals 126 assembled. Ring seal 130 is slipped in place and cap 128 is screwed down to shoulder 122*a*. Ring 132 is snapped in place and insulated mastic 134 is smeared over the cap and entire fairwater is bolted to the hub by means of bolts 89, with male prong 100*b* of connector 100 fitting into female connector 118 (FIG. 3). The voids in hub cap section 91 are filled with a waterproof material 91*b* through holes 91*a*. The cover plates 90 are now fitted over the bolt recesses which are also filled with a waterproof compound 89*a* on fairwater section 91. The hollow section 92 of the fairwater cap is filled with a mastic or foam 92*a* through plug fittings 92*b*. The assembled fairwater cap is coated with an epoxy resin 103 which completely covers metal section 91**.

As indicated hereinbefore, certain precautions must be taken to insulate the exposed internal metallic surfaces of the rubber-staved, water-lubricated bearings, such as bearing 34, FIG. 1. This is done to prevent possible circulating currents, which may exist between propeller shafting and conventional bearing lands, from causing localized corrosion of these members. Laboratory experiments conducted by the applicants have shown that when a propeller is polarized to a higher potential than the surrounding hull, a small current in the order of a few milliamperes will circulate between the bearing and the shaft journal. By introducing a resistance in the order of 4000 ohms or greater between the shaft and the hull, the circulating current observed was reduced to substantially zero. This same result is accomplished by applying a dielectric coating to the exposed internal metallic surfaces of the bearing, as described below.

Figure 6:
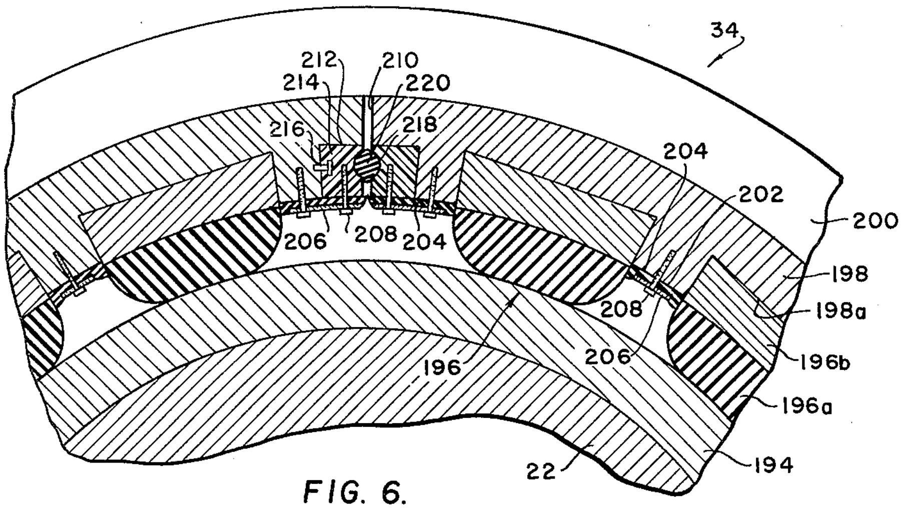
FIGS. 5 and 6 are transverse vertical sections through the strut bearing, illustrating the insulating of such bearing in accordance with this invention.
Figure 5:
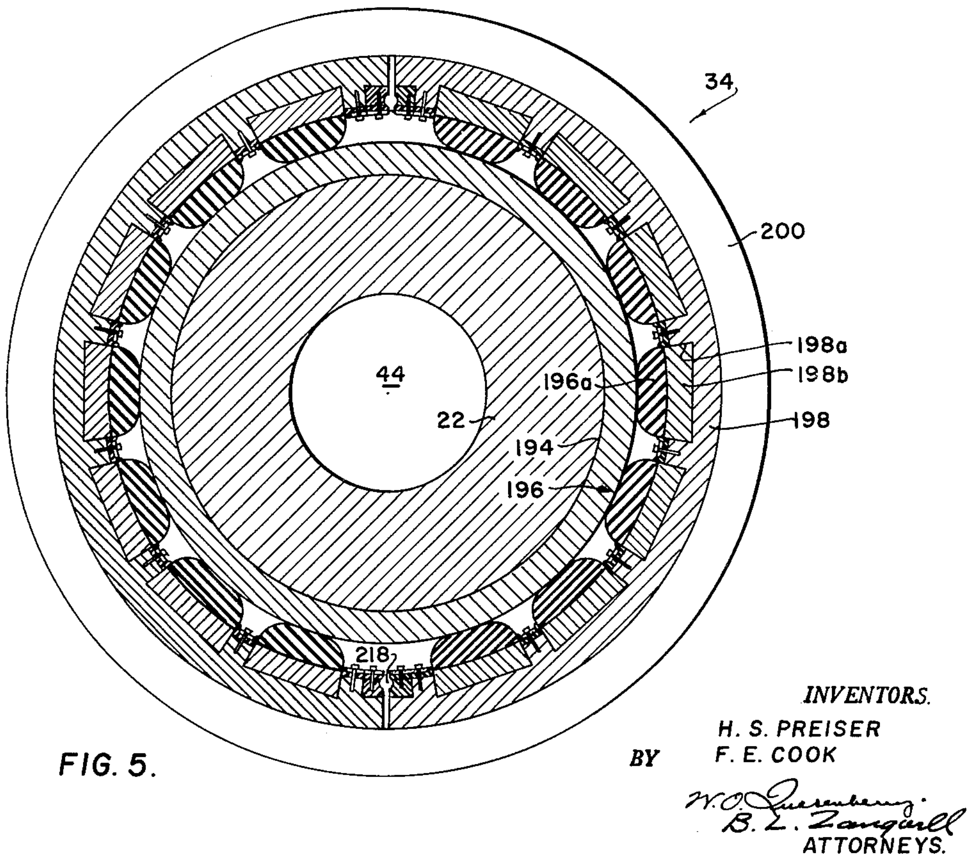

As shown in FIGS. 5 and 6, the steel propeller shaft 22, in which there is the axial bore 44, is provided with a bronze sleeve journal 194, shrunk on the shaft for purpose of providing a smooth rotating bearing surface. The journal rotates on bearing staves 196, which are so spaced in dove-tailed slots **198*a* in a bearing shell 198, as to provide axial flow of water through the spaces for lubrication and cooling purposes. Each of the bearing staves comprises a rubber-faced member 196*a* bonded to a bronze backing piece 196*b*, which backing plates fit into the slots 198*a* in the bearing shell. The bearing shell is keyed and fitted into a bearing housing 200 which is attached to the shaft strut 32 (FIG. 1). The normally exposed metal lands 202 are each covered with a molded rubber strip 204 cemented in place. The lips of the molded rubber strips bear against the rubber face staves 196*a* and form a flexible waterproof seal. Each of the rubber strips 204 is further secured to the lands by a plastic backing piece 206 which is fastened by plastic screws 208** tapped into the land at spaced intervals along the length thereof.

The bearing is assembled in halves and therefore modification of the edge seal is required. At each faying surface 210 of the bearing halves a recessed slot 212 is machined the full length of the bearing. A plastic insert piece 214 is fitted in each of the slots and cemented and screwed into place by recessed screws 216. A half round hole is drilled in each plastic insert so that when the two halves are mated a full hole 218 is formed. The rubber strips 204 and plastic backing pieces 206 are beveled slightly at the mating edges 210 of the bearing halves. Prior to assembly of the bearing halves a rubber gasket 220, of circular section is greased with silicone lubricant and stretched tightly across the half round groove in plastic insert piece 214. After the bearing halves have been assembled the rubber gasket 220, is allowed to expand and snap into place, filling hole 218 and forming a tight seal. The ends of the bearing are held in place by a plastic retaining ring (not shown) bolted to the housing 200.

Figures 7, 8, 9:
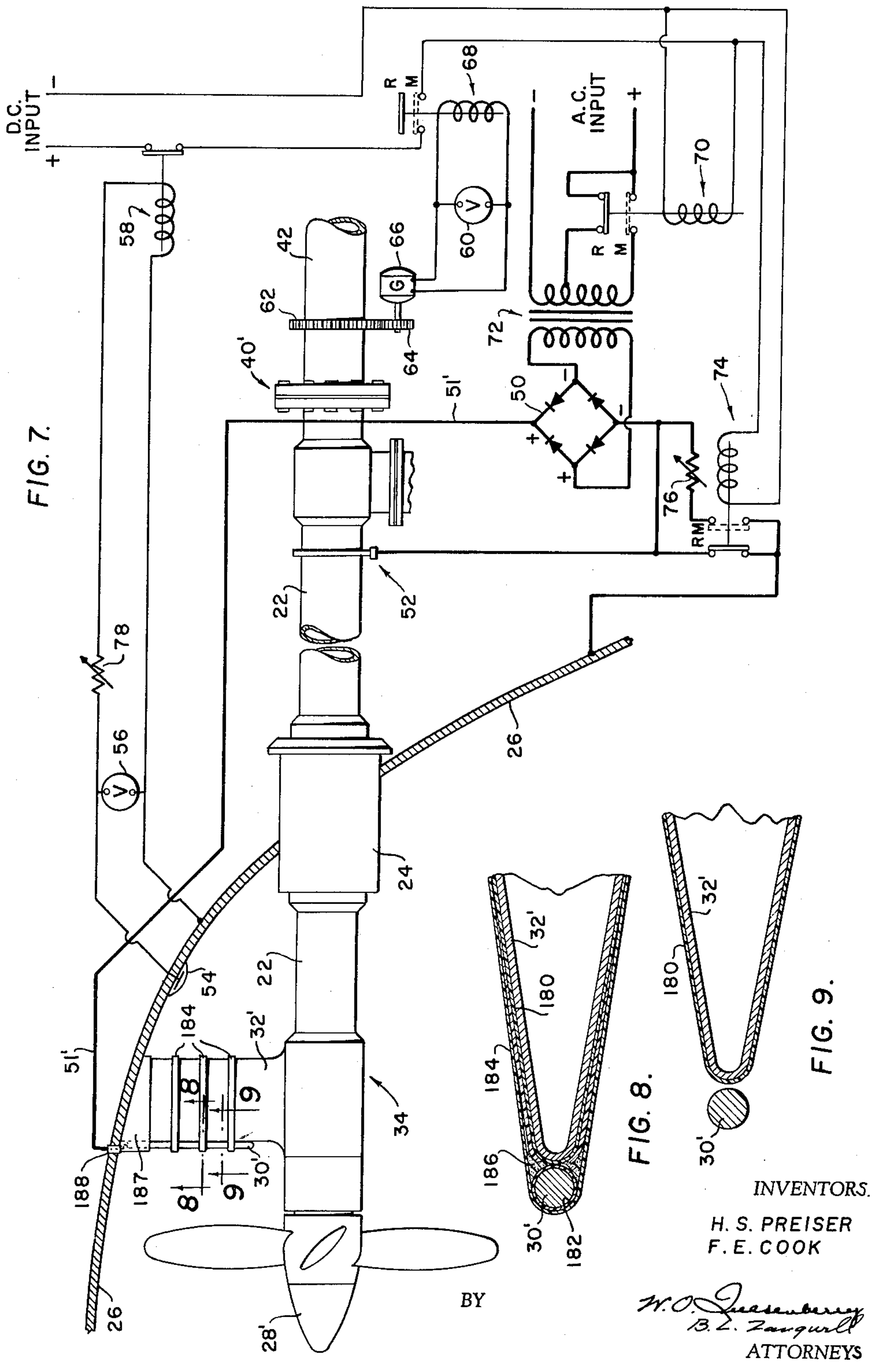
FIG. 7 is a schematic elevational view, similar to FIG. 1, illustrating a second embodiment of the instant invention wherein the anode is mounted on the stern strut.
FIG. 8 is a detailed horizontal section through the anode and strut and taken on line 8—8 of FIG. 7.
FIG. 9 is a detailed horizontal section, similar to FIG. 8, and taken on line 9—9 of FIG. 7.

The second embodiment of this invention, illustrated in FIG. 7, is generally similar to the first or preferred embodiment, except that with the second embodiment the anode is mounted on the stern strut, the central conductor through the shaft bore along with the specially constructed slip ring assembly and fairwater cap of the first embodiment are eliminated and current is conducted directly from the rectifier to the strut anode, the strut is more completely insulated against stray currents, and various other modifications are made, as pointed out in detail hereinafter, to accommodate the strut mounted anode.

Referring now to FIGS. 7, 8 and 9, in accordance with this second embodiment of the invention, the metal strut arm 32' is covered with three layers 180 of fiberglass reinforced epoxy resin laminate to a thickness of about fifty mils. The anode 30' is fabricated of platinum or platinum-palladium alloy clad on a tantalum or titanium rod. For a detailed description of such a rod anode, reference may be had to the copending patent applications of applicant Herman S. Preiser, Serial No. 530,647, now Patent No. 2,863,819, filed August 25, 1955, and Serial No. 766,156, filed October 7, 1958.

In accordance with the second embodiment of the instant invention, the rod anode 30' is fitted with a plurality of insulating sleeves 182, formed of polyvinyl chloride. These sleeves, which are about two inches in length, are cemented at one foot intervals along the length of the rod. The anode rod is then positioned on the trailing edge of the strut arm, as shown in FIG. 7, and a three layer band 184 of two inch wide glass reinforced epoxy resin laminate is wrapped around the strut and the rod at the immediate vicinity of each of the plastic sleeves 182, thereby tying the rod to the strut arm and leaving bare portions of the rod between the bands exposed to ambient sea water, as shown in FIG. 9. The spaces between the holding bands 184, the sleeves 182 and the plastic laminate 180 on the strut is then filled with an epoxy putty and rounded for fairness as indicated at 186 in FIG. 8. A relatively wide band 187 of glass reinforced epoxy resin is wrapped around the top of the strut arm and rod anode at the juncture with the hull 26.

Referring still to FIG. 7, the anode rod 30' is connected to the positive side of the rectifier 50 by a conductor 51' which conductor passes through the hull by way of a stuffing tube 188. For a detailed description of a stuffing tube suitable for this purpose, reference may be had to the copending application of Preiser et al., Serial No. 675,503, now Patent No. 2,949,417, filed July 31, 1957.

As pointed out hereinbefore, the specially constructed flange and slip ring assembly and the special fairwater hub cap of the FIG. 1 embodiment are eliminated in the FIG. 2 embodiment. However a suitable insulating flange connection between the shafts 22 and 42 may be required if shafts are not naturally isolated during rotation and is shown at 40', also a streamlined cap 28' is shown on the propeller hub.

The operation of the FIG. 7 embodiment is generally similar to that given above in connection with the FIG. 1 embodiment and need not be repeated here; it being sufficient to state that from the positive side of the rectifier 50, current flows through conductor 51' to the rod anode 30', from whence the current flows through the sea water path to the propeller blades, and from the propeller, the circuit is returned through the shaft and slip ring assembly 52 to the negative side of the rectifier and a portion of the current from the anode to the seapath flows to the hull, which current is returned through resistor 76 to the negative side of the rectifier.

The third embodiment of the instant invention is generally similar to the second embodiment, except that the strut anode of the second embodiment is replaced in the third embodiment by a cluster of hull anodes. Since the circuits and the structures, except for the type and location of the anodes, are the same in the third embodiment as in the second embodiment, only so much of the structure as is necessary for a complete understanding of the invention is shown in FIG. 10.

Referring now to FIG. 10 which illustrates the third embodiment of the invention, here there is shown the stern portion of the hull 26, screw propeller 20, tail shaft 22, stern tube 24, strut arm 32, bearing housing assembly 34 and reference electrode 54.

In accordance with this third embodiment of the invention, a cluster of anodes 30'' is mounted on the hull above the propeller. The cluster preferably includes four anodes, only three of which are shown, mounted on the hull preferably above the longitudinal and transverse center lines of the propeller. A rubber dielectric shield or blanket 190 insulates the anodes from the hull and extends on the hull about ten feet radially from each of the anodes. The anodes 30'' are preferably of the disc type formed of a sheet or plate of platinum or platinum-palladium alloy clad on a tantalum or titanium base and embedded, except for one major surface that is exposed to ambient sea water, in a plastic, dielectric holder.

In the FIGS. 27 and 28 of the copending patent application of Herman S. Preiser et al., Serial No. 631,377, now Patent No. 2,910,419, referred to above, there is disclosed a disc type of anode and a dielectric shield that is particularly adapted for use with this third embodiment of the instant invention. Therefore, for a complete description of such an anode and shield, reference may be had to said copending application.

As with the FIG. 7 embodiment of the invention, the anodes 30'' of the third embodiment are connected directly to the rectifier, not shown, by a lead 51'', which lead comprises four branches, one for each anode, each of which branches pass through the hull by means of stuffing tubes, not shown.

In operation of the FIG. 10 embodiment, current flows from the positive side of the rectifier through leads 51'' to the anodes 30'', from whence the current flows through the sea water path to the blades of the propeller, and the return circuit is completed through the tail shaft and grounded slip ring-brush assembly to the negative side of the rectifier and a portion of the current from the anode to the seapath flows to hull, which current is returned through resistor 76 to the negative side of the rectifier as in the FIG. 7 embodiment.

FIGS. 11 thru 20 schematically illustrate partial sections of a rotating propeller blade, delineating various actions and reactions such as streamlines, pressure-velocity relations, pressure-velocity-distance relations, nucleation and collapse of cavitation vapor bubbles, corrosion and cavitation damage, cathodic protection at low current densities, current lines from a hub anode to the propeller blades and ionization of sea water. formation of hydrogen gas by high density cathodic currents, collision of cavitation vapor bubbles with hydrogen bubbles, and a combining of vapor and hydrogen bubbles.

Figures 11, 12, 13, 14:
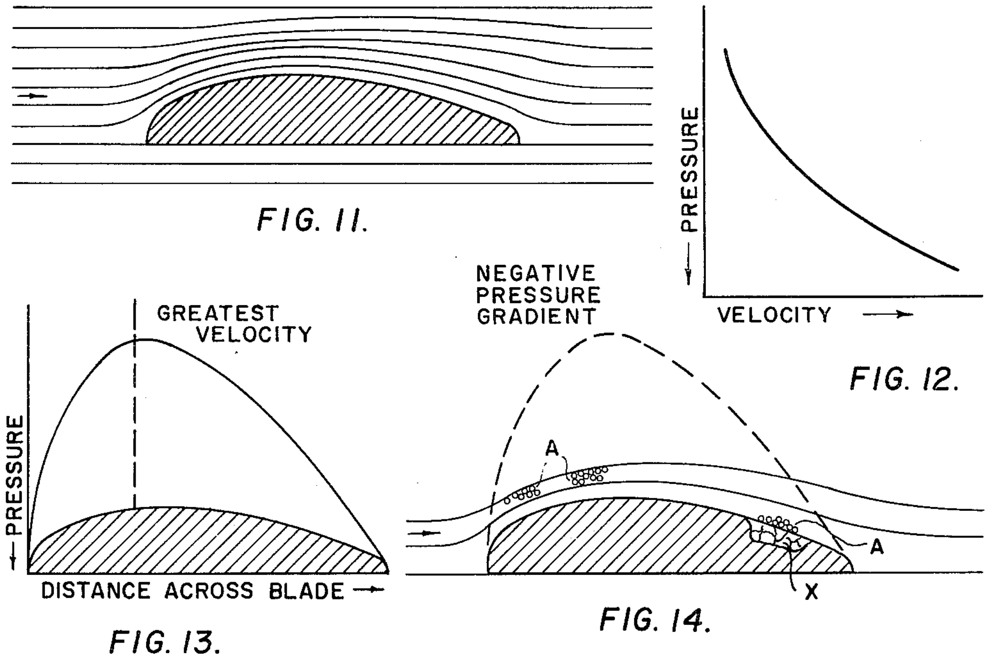
FIGS. 11 thru 20 are schematic views, illustrating various actions and reactions to which the blades of a ship's propeller are subjected.

Referring now to FIG. 11, which shows a partial section of a propeller blade over which water is flowing. As shown, the curvature of the surface of the blade causes the parallel streamlines of the water to distort and crowd as a result of the increase of velocity over this surface. The energy required to cause separation of flow is much greater than the energy required to increase the velocity; hence flow of water over a curved surface, such as a propeller blade, is accompanied by a local increase in velocity, which increase is inversely proportional to the distance between each streamline.

FIG. 12 illustrates how the local pressure in the ambient sea water varies with its local velocity. That is, as the velocity increases the pressure decreases, and vice versa.

FIG. 13 shows the variation of pressure in the sea water flowing over the propeller blade. The pressure decreases with each increase in velocity across the blade and then, after reaching the greatest velocity, the pressure increases as velocity of flow across the blade decreases.

FIG. 14 shows the nucleation of cavitation vapor bubbles, A, in the streamlines in areas of low pressure-high velocity (boiling). These vapor bubbles are dragged along the stream of water and are forced to collapse on the blade surfaces at areas of high pressure. The change of phase from a gas to a liquid (condensation) with the decrease of bubble area results in tremendous impact forces which damage the metal of which the blade is fabricated, which damage is indicated at X.

Figure 15:
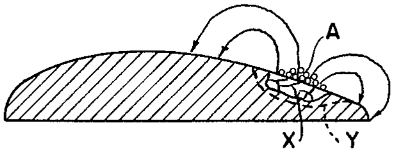

FIG. 15 shows that in addition to the mechanical damage, X, caused by the collapsing of vapor bubbles or cavities, A (cavitation), the metallurgical changes and fatigue stresses of the damaged area X act as local anodes in a galvanic cell which supply current to the surrounding cathodic surfaces. This combination accelerates the damage by superimposing a corrosion loss, Y, on the X loss caused by the mechanical means (cavitation).

Figure 16:
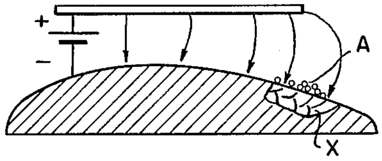

FIG. 16 shows an inert anode connected to the propeller blade through a suitable current source. At low current densities, the conventional method, the local galvanic cell is suppressed by cathodic protection. With this arrangement, corrosion is eliminated or appreciably reduced, but the mechanical damage, X, caused by cavitation still occurs.

Figure 17:
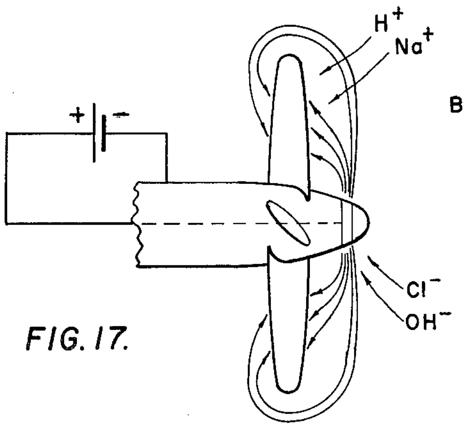

FIG. 17 shows an inert anode mounted on a propeller hub and connected to the current source (FIG. 1) in accordance with this invention. From the anode, the current flows through the ambient sea water to the propeller blades, as represented by the current lines (FIG. 17), whereby, as pointed out in detail hereinbefore, a high current density is maintained on the propeller blades. Sea water ionizes into several ions, $Na^+$, $Cl^-$, $H^+$ and $OH^-$. For purposes of simplicity of illustration, the higher mobility Cl and OH anions migrate toward the positively charged electrode (anode) and the H and Na cations migrate toward the cathode (propeller blades).

At the anode, $$2Cl^- \rightarrow Cl^2 + 2e$$

That is, chloride ions give up two electrons (negative charges) to the anode which transfers them through the internal circuit (rectifier) to the surface of the propeller blades.

At the propeller blades, $$2H^+ + 2e \rightarrow H_2 \text{ gas}$$

That is, the hydrogen ions migrate toward the negatively charged cathode (propeller blades) and pick up the two electrons converting the hydrogen ions into hydrogen atoms and thence into a gas.

Figure 18:
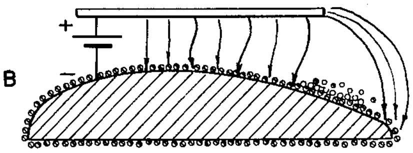

FIG. 18 shows how the hydrogen gas bubbles, B, generated by the high density cathodic current, are distributed over the propeller surface. Now, in addition to providing corrosion protection, the hydrogen gas bubbles B generated on the propeller blade surfaces act as cushions for the collapsing cavitation vapor bubbles, A, and thereby eliminates or appreciably reduces the mechanical damage of cavitation.

Figure 19:
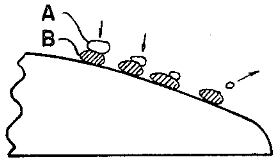

FIG. 19 shows the collision of a vapor bubble, A, with a hydrogen bubble, B, the vapor bubble being plain and the hydrogen bubble hatched. The hydrogen bubble absorbs the impact energy of the vapor bubble and compresses. Unon re-expansion of the hydrogen bubble, the remaining partially condensed vapor bubble is thrown clear of the blade surface and dissipated down stream.

Figure 20:
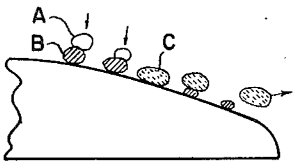

FIG. 20 illustrates another manner in which a hydrogen bubble eliminates a vapor bubble. Here the hydrogen bubbles combines with the vapor bubble to form a new bubble, C (shown in broken line hatching), containing the partial pressures of each gas. This low energy bubble is now lifted from the blade surface by the formation of a new hydrogen bubble and washed down stream.

Without further description it is thought that the novel features and advantages of the invention will be readily apparent to those skilled in the art to which this invention appertains, and it should be understood, of course, that the foregoing disclosure relates to only preferred embodiments of the invention and that numerous modifications of alterations may be made therein without departing from the spirit of the invention and scope of the claims.

What is claimed is:

1. A method of electrically protecting a ship's propeller against corrosion and cavitation damage in sea water electrolyte by a hydrogen evolution process, which comprises rendering the propeller the cathode in an electric circuit, locating an anode of the electric circuit in a position relative to the cathode propeller such that a major part of an electric current impressed on the anode flows therefrom through the sea water electrolyte to the propeller, impressing upon the anode an electric current of a relatively high order of current density and in excess of that required for cathodic protection of the propeller against corrosion, the actual current density impressed upon the propeller being in excess of about 10 ma. per sq. ft. of propeller surface and also being at least 30 times the current density of any portion of the cathodic electric current which passes through the surface of the ship's hull, whereby the sea water electrolyte is ionized and hydrogen generated thereby maintains the propeller in a protective cathodic condition while simultaneously providing excess hydrogen in the form of bubbles on the propeller surfaces which hydrogen bubbles cushion cavitation vapor bubbles tending to collapse on the propeller surface.

2. A method of cathodically protecting the metal of a ship's hull against corrosion and of protecting the metal blades of a ship's propeller against corrosion and cavitation damage by electrolytic evolution of hydrogen gas on the surfaces of the propeller blades, which comprises rendering the propeller blades and the hull cathodes in an electric circuit with ambient sea water the electrolyte, locating an inert anode of the electric circuit in a position relative to the propeller blades and the hull such that at least a greater portion of an electric current applied to the anode flows therefrom through the sea water electrolyte to the propeller blades and the hull, applying to the anode an electric current of relatively high current density for flow therefrom through the sea water electrolyte to the surface of the propeller blades and of the hull, the current density impressed upon the propeller being in excess of about 10 ma. per sq. ft. of propeller surface and also being at least 30 times the current density impressed on the ship's hull, whereby the current maintains the metal surfaces of the propeller blades in a protective cathodic condition while simultaneously generating hydrogen gas bubbles on the surfaces of the propeller blades in sufficient quantity as to prevent the collapse of cavitation vapor bubbles on such surfaces.

3. The method set forth in claim 2 wherein the relatively high current density applied to the anode is divided between the surfaces of the propeller blades and the surface of the ship's hull so the ship's hull is cathodically protected against corrosion at a hull current density not exceeding about 5 ma. per sq. ft. of hull.

4. The method set forth in claim 2 wherein the division of current between the propeller blades and the ship's hull is controlled responsive to the speed of rotation of the propeller.

5. The method set forth in claim 2 wherein the division of current between the propeller blades and the ship's hull is controlled responsive to the degree of polarization of the ship's hull.

References Cited in the file of this patent

UNITED STATES PATENTS

| | | |
|---|---|---|
| 921,641 | Cumberland | May 11, 1909 |
| 2,576,680 | Guitton | Nov. 27, 1951 |
| 2,700,649 | Hosford | Jan. 25, 1955 |
| 2,759,887 | Miles | Aug. 21, 1956 |
| 3,023,234 | Anderson | Feb. 20, 1962 |

FOREIGN PATENTS

| | | |
|---|---|---|
| 3,388 of 1903 | Great Britain | Sept. 17, 1903 |
| 503,946 | Great Britain | July 9, 1937 |